United States Patent
Sharma et al.

(10) Patent No.: US 10,404,807 B2
(45) Date of Patent: Sep. 3, 2019

(54) NOTIFICATION SYSTEMS

(71) Applicant: HEWLETT-PACKARD DEVELOPMENT COMPANY, L.P., Houston, TX (US)

(72) Inventors: Puneet Sharma, Palo Alto, CA (US); Roque Luis Scheer, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/748,176

(22) PCT Filed: Oct. 16, 2015

(86) PCT No.: PCT/US2015/055912
§ 371 (c)(1),
(2) Date: Jan. 26, 2018

(87) PCT Pub. No.: WO2017/065798
PCT Pub. Date: Apr. 20, 2017

(65) Prior Publication Data
US 2018/0227372 A1 Aug. 9, 2018

(51) Int. Cl.
*H04L 29/08* (2006.01)
*H04L 29/06* (2006.01)
(Continued)

(52) U.S. Cl.
CPC ........ *H04L 67/145* (2013.01); *H04L 12/1859* (2013.01); *H04L 12/1895* (2013.01);
(Continued)

(58) Field of Classification Search
CPC . H04L 67/145; H04L 69/165; H04L 12/1895; H04L 67/26
See application file for complete search history.

(56) References Cited

U.S. PATENT DOCUMENTS

| 7,869,794 B1 | 1/2011 | Weaver |
| 8,260,946 B1 | 9/2012 | Ruppert et al. |

(Continued)

FOREIGN PATENT DOCUMENTS

CN 103458367 A 12/2013

OTHER PUBLICATIONS

Sharma et al., WO2017065798, Written Opinion, dated Oct. 16, 2015, 10 pages.

(Continued)

*Primary Examiner* — Nicholas R Taylor
*Assistant Examiner* — Sanjoy K Roy
(74) *Attorney, Agent, or Firm* — HPI Patent Department

(57) ABSTRACT

An example method, for implementation by an example notification system, comprises creating a TCP connection between a client device and a cloud device; sending, by the cloud device, a first UDP message to the client device; and waiting, by the client device, to receive the first UDP message until a predetermined time after the creation of the TCP connection. If the client device has not received the first UDP message by the predetermined time, the method comprises sending, by the client device, a second UDP message to the cloud device, wherein sending the second UDP message starts an open time period during which the client device is able to receive UDP messages from the cloud device.

13 Claims, 7 Drawing Sheets

(51) Int. Cl.
*H04L 12/18* (2006.01)
*H04L 29/12* (2006.01)

(52) U.S. Cl.
CPC ...... *H04L 61/2514* (2013.01); *H04L 61/2553* (2013.01); *H04L 67/10* (2013.01); *H04L 67/125* (2013.01); *H04L 67/26* (2013.01); *H04L 67/42* (2013.01); *H04L 69/165* (2013.01); *H04L 63/029* (2013.01)

(56) References Cited

U.S. PATENT DOCUMENTS

| | | | |
|---|---|---|---|
| 2003/0177228 A1* | 9/2003 | Vigouroux | G06F 11/3006 709/224 |
| 2007/0140159 A1 | 6/2007 | Eronen et al. | |
| 2008/0205288 A1* | 8/2008 | Herzog | H04L 29/12471 370/252 |
| 2009/0240824 A1* | 9/2009 | Rekhtman | H04L 29/12471 709/230 |
| 2012/0331087 A1* | 12/2012 | Luna | H04L 67/2842 709/213 |
| 2014/0006481 A1 | 1/2014 | Frey et al. | |
| 2014/0108668 A1 | 4/2014 | Zhang et al. | |
| 2014/0148205 A1 | 5/2014 | Grinshpun et al. | |
| 2014/0204412 A1* | 7/2014 | Pizot | G06F 3/1296 358/1.15 |
| 2014/0211764 A1 | 7/2014 | Sundararajan et al. | |
| 2014/0359159 A1* | 12/2014 | Diaz-Cuellar | H04W 52/0225 709/235 |
| 2015/0110129 A1 | 4/2015 | Tran | |
| 2016/0150589 A1* | 5/2016 | Zhao | H04L 67/14 370/328 |

OTHER PUBLICATIONS

Sharma et al., WO2017065798, International Search Report, dated Oct. 16, 2015, 3 pages.

Anywhere Software, "Other push notifications?" B4X Community, http://www.b4x.com/android/forum/threads/otherpushnotifications.17723/, May 10-14, 2012, 5 pages.

Puneet Sharma, David Lee,, Wenjie Lin, Subu Iyer, Laurent Pizot, Chandrasekar Venkatraman, Ajay Gupta. "TCP Parking; Scaling ePrint Service to Millions of Printers", HP Tech Con 2012.

* cited by examiner

NOTIFICATION SYSTEMS

BACKGROUND

Various IT services are provided as cloud-based services, where a client device (or an application running on a client device) accesses a given service via a connection to a cloud device (e.g. a server) on which that service is hosted. A cloud-based IT service can contact a client device application, e.g. to notify a client device application of an event, using a short message which triggers the client device application to retrieve the information to handle the notified event from the cloud-based service.

BRIEF DESCRIPTION OF THE DRAWINGS

The following detailed description references the drawings, wherein.

DETAILED DESCRIPTION

Figure 1:
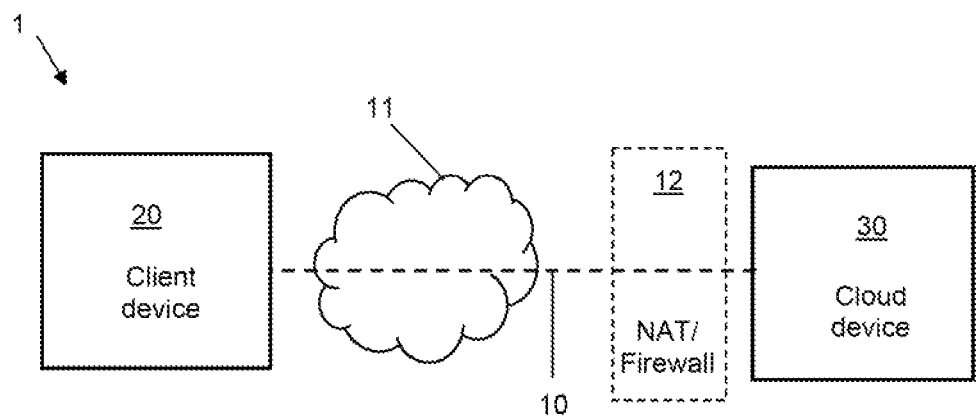
FIG. 1 is a block diagram of an example notification system.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Cloud-based IT services rely on the timely delivery of notification messages from a cloud device (for example, a cloud server) to client devices. A cloud-based service may provide services to client devices (or an application running on a client device, herein after termed a 'client application') that are behind network address translation (NAT) devices and firewalls. In this case, it may be that the client devices/applications can initiate a connection with the cloud service but the cloud service is incapable of initiating connection to the client devices. The client devices may connect to the cloud service over a transport connection (e.g. Transport Control Protocol (TCP)) or in a secure manner (e.g. transport layer security (TLS)/secure sockets layer (SSL)).

Where a NAT device or firewall exists between the cloud device and a client device, the client device may maintain a persistent connection with the cloud service in order that the client device, or a client application running thereon is able to timely receive notification messages from the cloud service. The connections are bidirectional such that client device(s) or client application(s) can actively submit data to the cloud service, while the cloud service can push its notifications to the client devices or client application(s). If a connection is lost, the client device may be to then attempt to reconnect with the cloud service. Many of the connections between a cloud service and a client application may be idle for the majority of the time.

Maintaining a persistent connection for each individual client device using a cloud service ensures good responsiveness, but such persistent connections increase the power consumption of the client device and increase traffic on the network linking the client device to the cloud device. Maintaining persistent connections with a large number of client applications also uses significant computing resource at the cloud device end. In particular, maintaining state for large numbers of simultaneous persistent connections, with support for security and session management, consumes an inordinately large amount of memory.

There may, therefore, exist a technical challenge in scaling up the use of persistent connections for delivering notifications from cloud services to client applications. As the use of cloud-based servers increases, potentially millions of client applications could be simultaneously connected to a given cloud service. The large server side infrastructure to maintain millions of simultaneous TCP or other transport connections is unaffordable for all except large cloud service providers.

Examples disclosed herein provide technical solutions to these technical challenges. An example notification system provides a lightweight solution for maintaining persistent connections between client devices and a cloud device, which enables a large number of persistent connections to be maintained using relatively little computing and network resource.

The examples involve exchanging messages between a client device and a cloud device using the User Datagram Protocol (UDP) instead of TCP connection. UDP is a connectionless protocol which has no handshaking message exchange. Computing devices can use UDP to send short messages to other computing devices over an IP network without any prior communication (e.g. successful TCP connection handshake message exchange) between the devices to set up special transmission channel or data path, provided that no firewall or NAT device exists between the sending and receiving computing devices. Typically, NAT devices and firewalls only allow incoming UDP messages to pass though them in reply to an earlier outgoing UDP message, and for a limited amount of time.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on FIG. 1 is an example notification system 1 that can maintain a persistent connection between a client device 20 (or an application on client device 20) and a cloud device 30 with a low computational overhead. The notification system 1 comprises the client device 20 (and potentially a large number of other client devices) and the cloud device 30. In some examples the notification system 1 comprises multiple cloud devices. The cloud device 30 may be remote from the client device 30. The client device 20 is connected to the cloud device 30 by a communications link 10. In this example, the communications link 10 comprises, for at least a portion thereof, the internet 11. In other examples, the communications link 10 may comprise for example, a wired connection, a wireless network, a local area network, etc. In some examples the communications link 10 is a secure communications link. For example, the communications link 10 can be established according to the TLS or SSL protocol. In the example of FIG. 1, the communications link 10 passes via a NAT device or a firewall 12, however there may not be such a NAT device or firewall 12 between each client device 20 and cloud device 30.

In FIG. 1 and other Figures described herein, different numbers of components, processing units, or entities than depicted may be used.

Figures 2, 3:
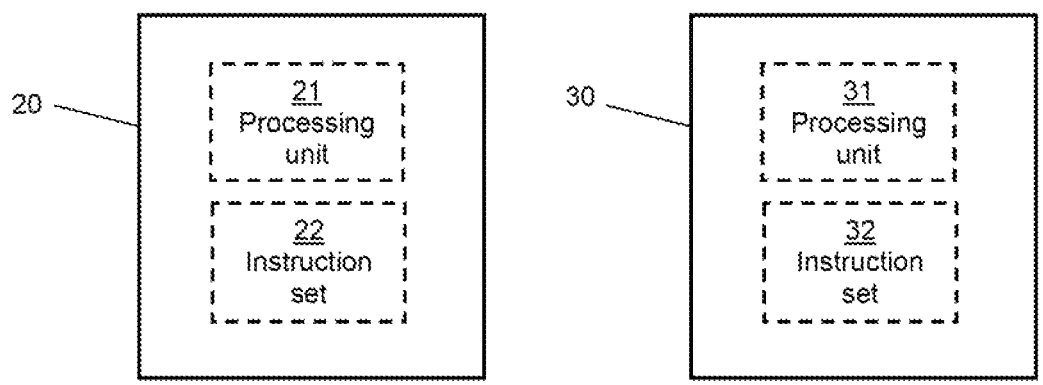
FIG. 2 is a block diagram of an example client device
FIG. 3 is a block diagram of an example server.

FIG. 2 shows the example client device 20. The client device 20 may be comprised in a notification system, e.g. the notification system 1. The client device 20 may be a desktop computer, a notebook computer, a tablet, a smartphone, a printer, a peripheral storage device, a camera, a refrigerator, a digital picture frame, or any other smart device suitable for providing a user with access to cloud-based IT and other services. Any number of client devices 20 may exist and expect to maintain a persistent connection to a cloud device.

In the example of FIG. 2, the client device 20 comprises a processing unit 21, and an instruction set 22. The instruction set 22 may, for example, be stored on a machine-readable storage medium of the client device 20.

The processing unit 21 may comprise one or several central processing units (CPUs), microprocessors, and/or other hardware devices suitable for retrieval and execution of instructions, e.g. instructions of the instruction set 22. The processing unit 21 may fetch, decode, and execute instructions of the instruction set 22 to enable maintenance of a persistent connection between the client device 20 and a cloud device (e.g. the cloud device 30) with a low computational overhead, as described below. As an alternative or in addition to retrieving and executing instructions, processing unit 21 may include one or more electronic circuits comprising a number of electronic components for performing the functionality of part or all of the instruction set 22.

In some examples the client device 20 may further comprise one or several interfaces for communicating with other computing devices, e.g. the cloud device 30. Such interfaces may be wireless interfaces such as wireless local area network (WLAN) interfaces and/or physical interfaces such as Ethernet interfaces, Universal Serial Bus (USB) interfaces, external Serial Advanced Technology Attachment (eSATA) interfaces, or any other physical connection interface suitable for communication with other computing devices. In operation of the client device 20, as detailed below, interfaces may be used to send and receive data to and from other computing devices. The client device 20 may send and receive data to and from other computing devices using communications protocols including, but not limited to, TCP and UDP.

In some examples the client device 20 may further comprise a machine-readable storage medium. In some such examples the instruction set 22 may be stored on the machine-readable storage medium. The machine-readable storage medium may be any electronic, magnetic, optical, or other physical storage device that stores executable instructions. Thus, the machine-readable storage medium may be, for example, Random Access Memory (RAM), Content Addressable Memory (CAM), Ternary Content Addressable Memory (TCAM), an Electrically-Erasable Programmable Read-Only Memory (EEPROM), flash memory, a storage drive, an optical disc, and the like.

The instruction set 22 is for execution by the processing unit 21 of the client device 20. In some examples the instruction set 22 is comprised in an application installed on the client device 20. For example, the instruction set 22 may be comprised in a cloud-based IT service application on the client device 20. In other examples the instruction set 22 may be comprised in a client-end notification application on the client device 20, which mediates connections between other applications on the client device 20 and one or more cloud devices. The instruction set 22, when executed by the processing unit 21, causes the client device to perform a set of operations which will be collectively referred to as a "UDP probing process". The operations comprised in such a UDP probing process are described below.

The instruction set 22, when executed by the processing unit 21, causes the client device to initiate a TCP connection with a cloud device, e.g. the cloud device 30. The client device may initiate the TCP connection using, e.g., a handshake process.

The instruction set 22, when executed by the processing unit 21, further causes the client device 20 to wait, for a predetermined amount of time, to receive a first UDP message from the cloud device (i.e. the cloud device to which the client device initiated the TCP connection). The predetermined amount of time may start at the time of initiating the TCP connection. The predetermined amount of time may have a duration in the range of 5 to 10 seconds, although this range could be longer or shorter and may depend on the intended speed of communication and/or the current communication link conditions such as whether there is congestion on one or more communication links.

If a first UDP message is not received by the client device 20 from the cloud device before the expiry of the predetermined amount of time, in some examples the instruction set 22 may, when executed, cause the client device 20 to send a second UDP message to the cloud device. Most NAT devices and firewalls accept incoming UDP messages received at a port opened by a previous outgoing UDP message, within a limited time period. The duration of this time period (herein after referred to as an "open" time period) depends on the model and configuration of the NAT device or firewall. The sending of a second UDP message from the client device 20 to the cloud device therefore creates, for a time period, a communications path between the cloud device and the client device, which the cloud device can use to send UDP messages to the client device. The sending of a second UDP message by the client device 20 therefore starts an open time period during which the client device 20 is able to receive UDP messages from the cloud device. The notification system may be able to determine the duration of an open time period of a given NAT device or firewall, as is explained below.

In some examples, if a first UDP message is received by the client device 20 from the cloud device before the expiry of the predetermined amount of time, the instruction set, when executed, further causes the client device 20 to close the TCP connection with the cloud device. The first UDP message is not sent in reply to an outgoing UDP message from the client device, and is therefore not sent during an open period of any firewall or NAT device that may exist between the client device and the cloud device. Therefore, if the client device receives the first UDP message, this indicates that an open UDP communications path exists between the client device and the cloud device (which will generally mean that no firewall or NAT device is present). As such, UDP communication between the client device and the cloud device will always be possible, even without the sending of any keep-alive messages. The overhead associated with the UDP communications in this scenario will be very low, and certainly significantly lower than the overhead associated with maintaining a persistent TCP connection. Thus, in this scenario (i.e. where no firewall or NAT device exists) the TCP connection may be closed.

In some examples, if a first UDP message is received by the client device 20 from the cloud device before the expiry of the predetermined amount of time, the instruction set when executed, further causes the client device 20 to send an acknowledgement message to the cloud device. The acknowledgement message may comprise a UDP message. The acknowledgement message may indicate that the client device 20 received the first UDP message by the predetermined time. In some examples the instruction set 23 is then executed to cause the client device 20 to respond to receiving a first UDP message before the expiry of the predetermined amount of time, close the TCP connection and send an acknowledgement message to the cloud device.

If a first UDP message is not received by the client device 20 from the cloud device before the expiry of the predetermined amount of time, in some examples the instruction set 22, when executed by the processing unit 21, further causes the client device 20 to determine the duration of a open time period during which the client device is able to receive UDP messages from the cloud device. In some examples determining the duration of the open time period may comprise retrieving information (e.g. information about the settings of a firewall or NAT device between the cloud device and the client device) from a memory of the client device. However; in many situations information enabling the client device to determine the duration of the open period will not be available in the memory of the client device. Therefore, in some examples determining the duration of the open time period comprises the client device 20 performing a test process (hereinafter referred to as a "UDP handshake" process). In some such examples, if a first UDP message is not received by the client device 20 from the cloud device before the expiry of the predetermined amount of time, the instruction set 22, when executed, causes the client device 20 to perform a UDP handshake process.

A UDP handshake process may comprise, for example, the client device sending a first UDP test message to the cloud device which requests a reply after a predetermined delay time, waiting for a reply from the cloud device, and then repeating the process with one or more further UDP test messages which specify different delay times. In some examples the first UDP test message may specify a relatively short delay time and each successive UDP test message may specify an incrementally longer delay time. In some examples the first UDP test message may specify a relatively long delay time and each successive UDP test message may specify an incrementally shorter delay time. In some examples the first UDP test message may specify a relatively long delay time, a second UDP test message may specify a relatively short delay time, a third UDP test message may specify a delay time incrementally shorter than the delay time of the first UDP test message, a fourth UDP test message may specify a delay time incrementally longer than the delay time of the second UDP test message, and so on. In some examples the increments change exponentially. In some examples the delay times may be determined based on a binary search.

Figure 4:
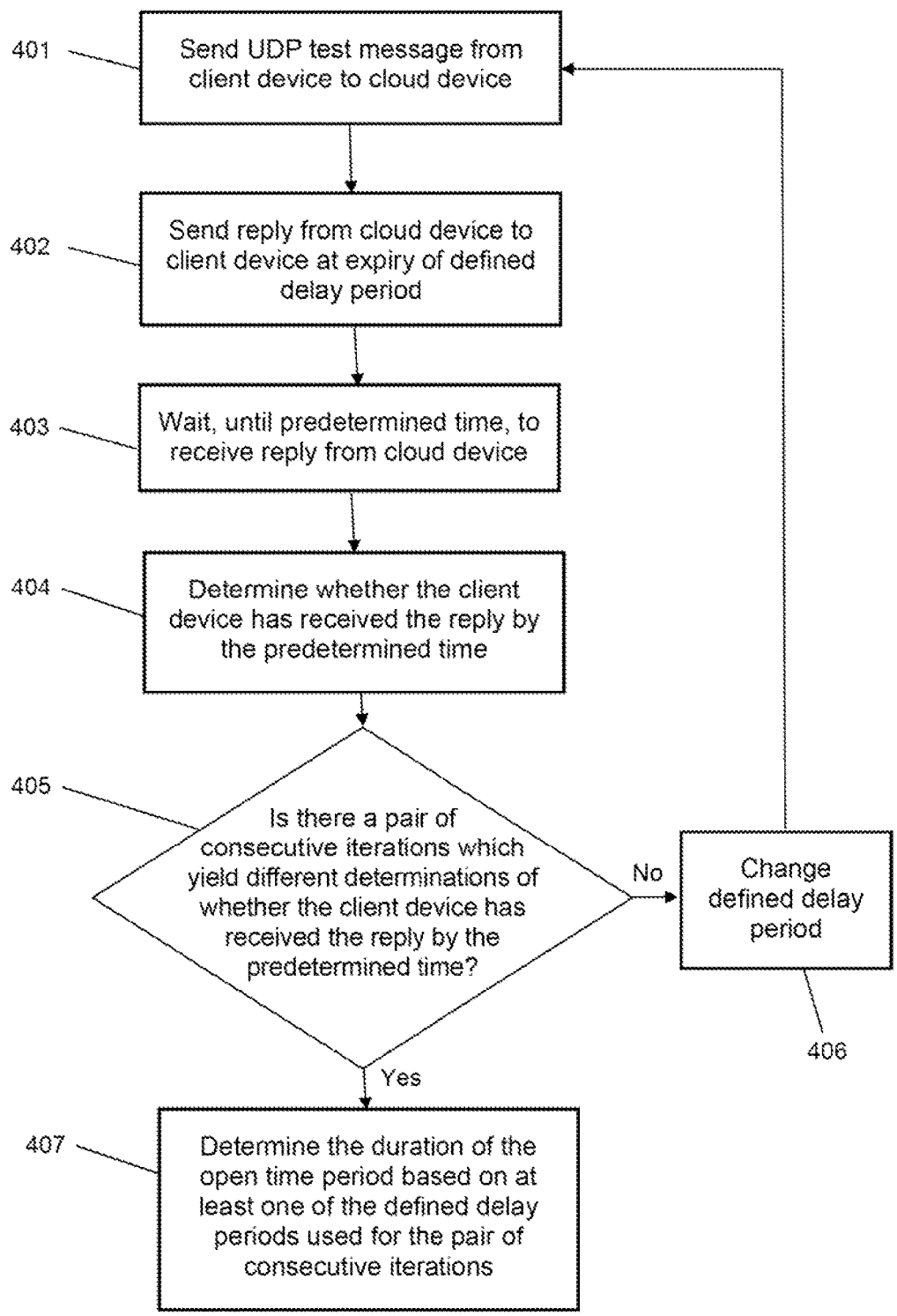
FIG. 4 is a flow chart of an example UDP handshake process.

FIG. 4 is a flow chart illustrating an example UDP handshake process. The flow chart in FIG. 4 and other figures may be implemented in the form of executable instructions (e.g. the instruction set 22 and/or the instruction set 32) stored on a machine-readable storage medium, by one or several components described herein, and/or in the form of electronic circuitry.

The various processing blocks and/or data flows depicted in FIG. 4 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the operations depicted in the flow diagram as illustrated (and described in greater detail below) are meant be an example and, as such, should not be viewed as limiting.

In block 401 the client device sends a UDP test message to the cloud device. The UDP test message may comprise a second UDP message as described above in relation to the operation of the client device 20. The UDP test message may include a payload. The UDP test message may indicate a time at which it was sent by the client device 20. For example, a timestamp or sequence number in the payload can enable a UDP test message to be precisely matched to its reply. However; it is expected that on a network fast enough to enable UDP communication between the client device and cloud device it is very unlikely that any mismatch between UDP test messages and the corresponding replies to occur. The UDP test message may request the cloud device to send a reply (e.g. an acknowledgement message). In some examples (e.g. examples in which block 501 is performed by the client device) the UDP test message may indicate, e.g. in the payload, the delay period and may request the cloud device to send a reply at the expiry of the delay period.

In block 402 the cloud device sends a reply to the client device at the expiry of the delay period. The reply may be sent using the UDP protocol. The reply may comprise an acknowledgement message. The reply may include information identifying a UDP test message to which it corresponds (i.e. the UDP test message which is being replied to).

In block 403 the client device waits, until a predetermined time, to receive a reply from the cloud device. This predetermined time is set based on the delay period specified in the UDP test message.

In block 404, it is determined whether the client device has received the reply by the predetermined time. In some examples block 404 is performed by the client device, in which case determining whether the reply has been received by the predetermined time may comprise the client device waiting for a reply until the predetermined time. In some such examples the client device 20 may determine that a reply to the UDP test message has not been (and/or will not be) received if a reply to the UDP test message has not been received by the expiry of the predetermined amount of time.

In some examples block 404 may be performed by the cloud device, in which case determining whether the reply has been received by the predetermined time may comprise the cloud device receiving an indication from the client device about whether or not it received the reply by the predetermined time.

In block 405, it is determined whether a pair of consecutive iterations (i.e. of blocks 401-404) have yielded different determinations of whether the client device has received the reply by the predetermined time. Performing block 405 may comprise comparing a determination of whether the client device has received the reply yielded by the current iteration to a determination of whether the client device has received the reply yielded by a previous iteration. The previous iteration may be the iteration immediately preceding the current iteration. A pair of different determinations comprises a determination that the client device has received the reply by the predetermined time, and a determination that the client device has not received the reply by the predetermined time. Block 405 may be performed by the client device or by the cloud device. Block 405 may be performed by the same device as block 404.

If it is determined in block 405 that there does not exist a pair of consecutive iterations which yield different determinations (i.e. all pairs of consecutive iterations so far performed have yielded the same determination), in block 406 the defined delay period is changed. Changing the defined delay period may comprise increasing the delay period, such that the new delay period is incrementally longer than the previous delay period. Changing the defined delay period may comprise decreasing the delay period, such that the new delay period is incrementally shorter than the previous delay period. Changing the defined delay period may comprise changing the defined delay period in accordance with a binary search process. Block 405 may be performed by the client device or by the cloud device. Block 405 may be performed by the same device as block 404. Once block 406 is complete, blocks 401-405 are repeated using the new delay period.

If it is determined in block 405 that there exists a pair of consecutive iterations which yield different determinations, in block 407 the duration of the open time period is determined based on at least one of the defined delay periods used for the pair of consecutive iterations. In some examples the duration of the open time period is determined to be equal to one of the defined delay periods used for the pair of consecutive iterations. In some examples the duration of the open time period is determined to be a function of one or both of the defined delay periods used for the pair of consecutive iterations. In some examples the duration of the open time period is determined to be an average of the defined delay periods used for the pair of consecutive iterations.

Figure 5:
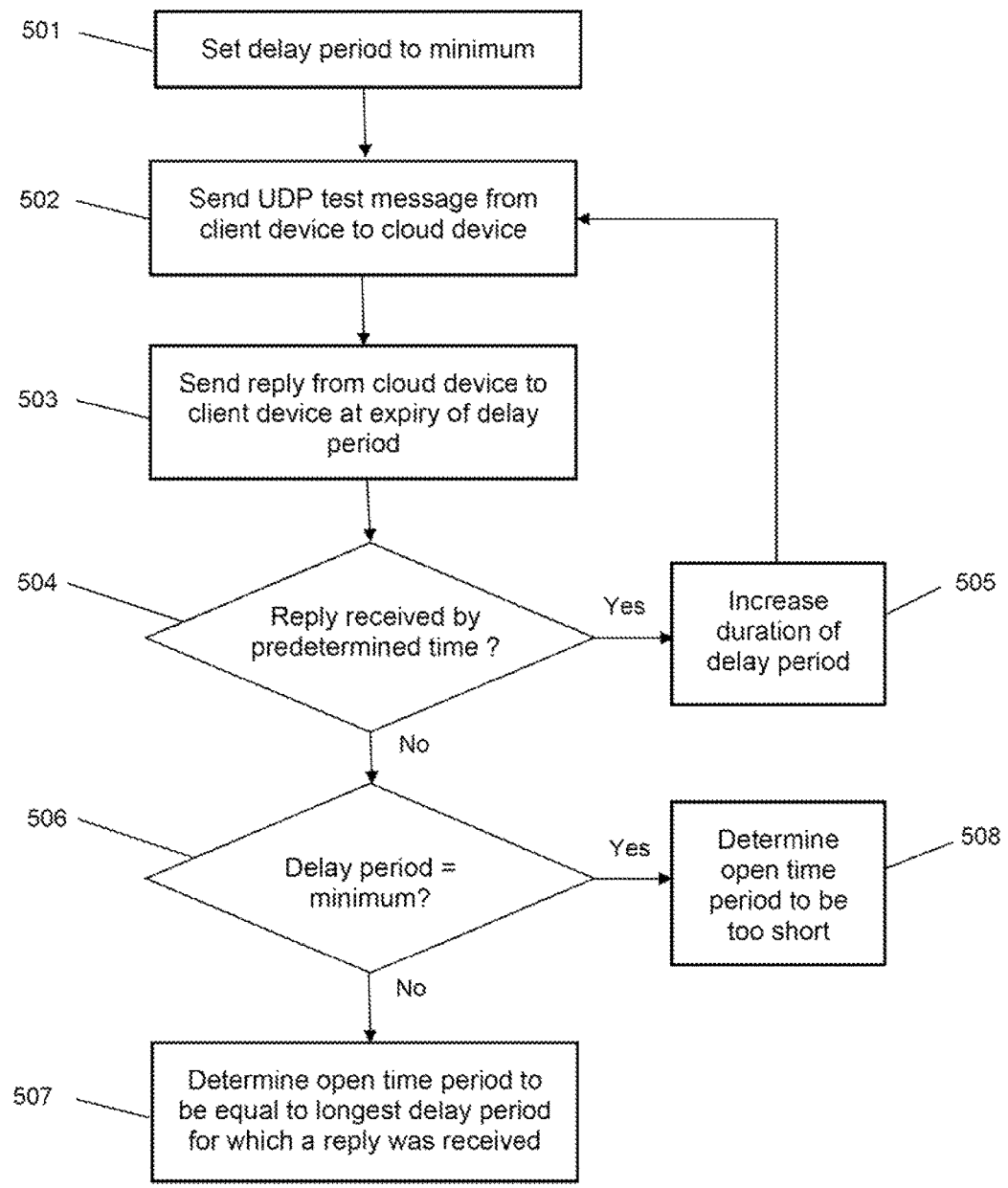
FIG. 5 is a flow chart of an example UDP handshake process.
Figure 6:
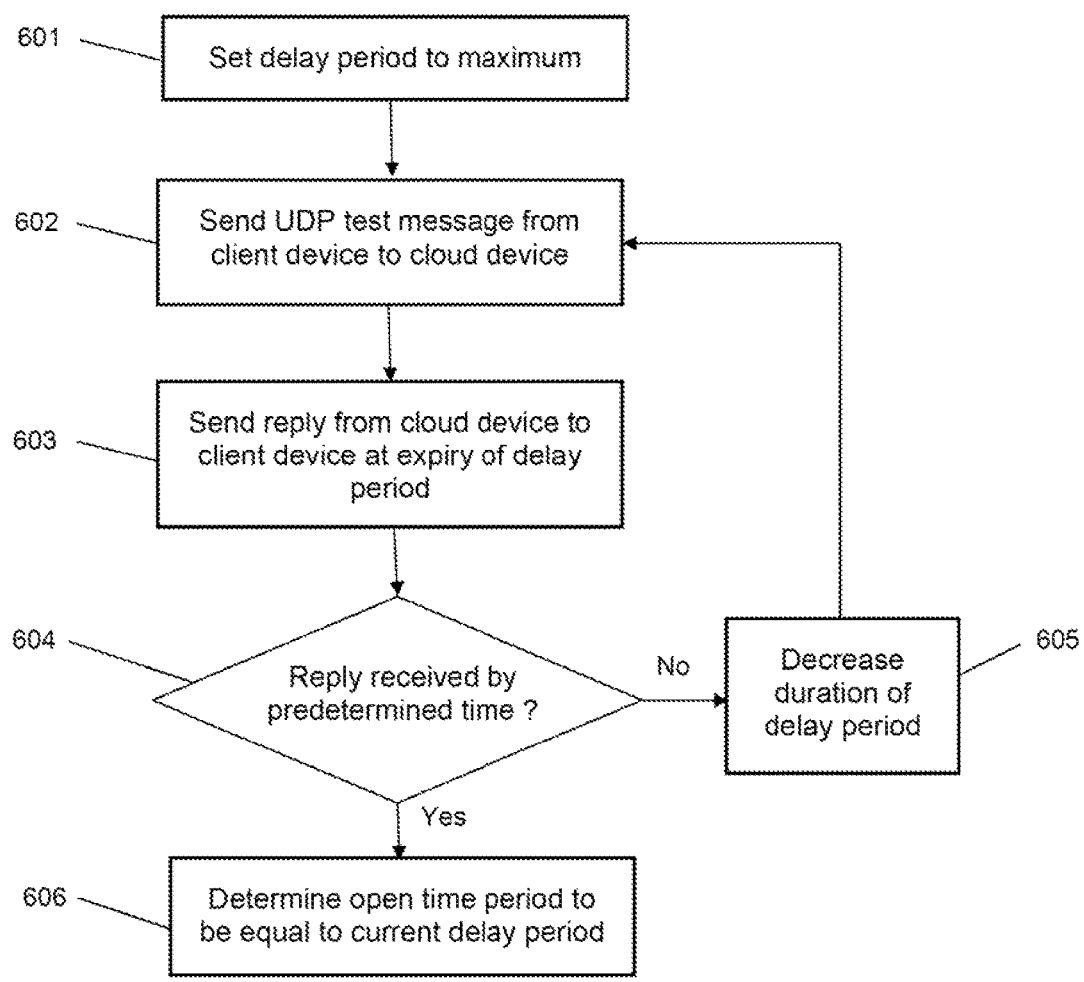
FIG. 6 is a flow chart of an example UDP handshake process.
Figure 7:
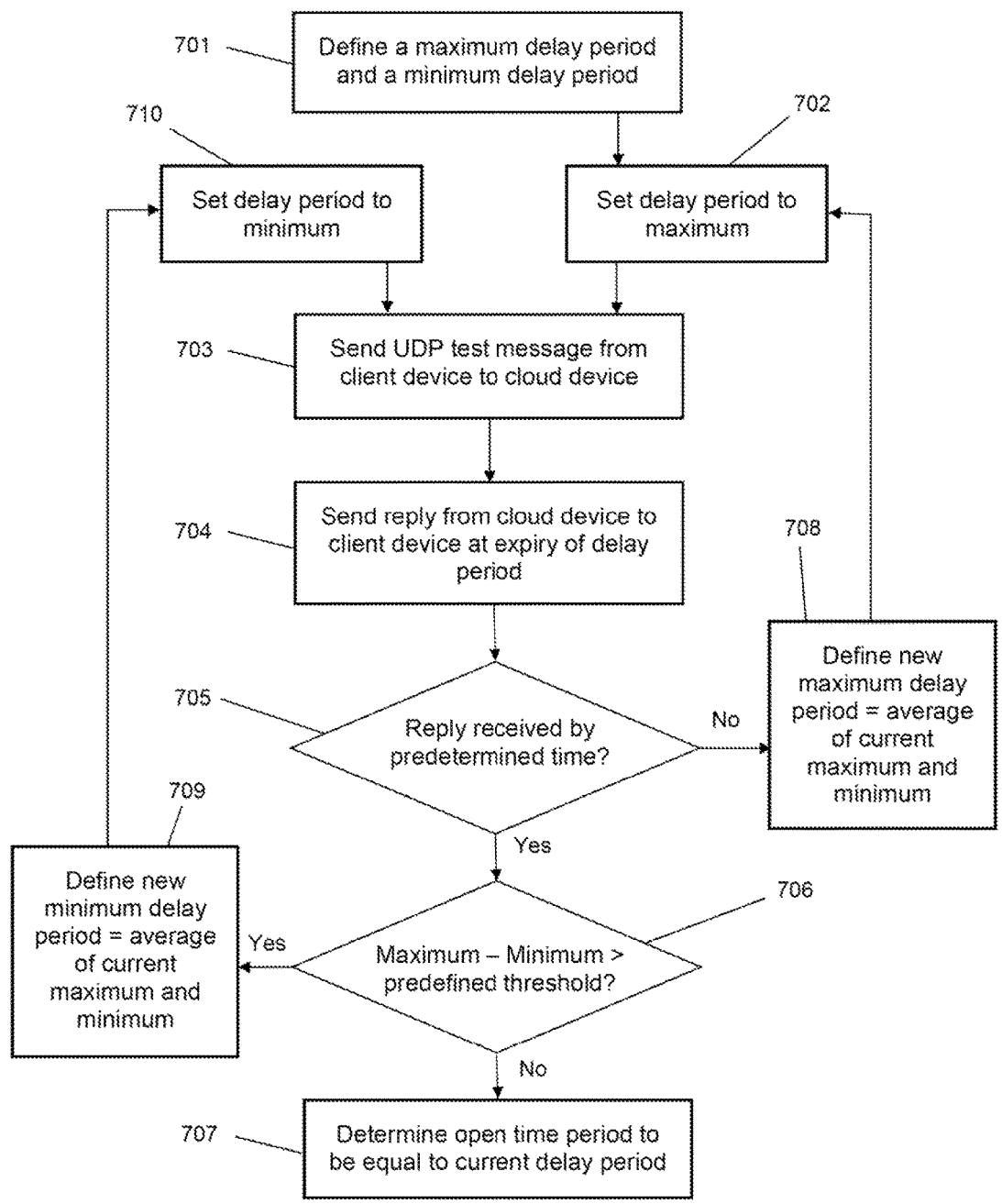
FIG. 7 is a flow chart of an example UDP handshake process.

FIGS. 5, 6 and 7 are flow charts illustrating further specific examples of UDP handshake processes. FIG. 5 is an example of a 'min-start' handshake process. FIG. 6 is an example of a 'max-start' handshake process. FIG. 7 is an example of a 'binary search' handshake process.

The example UDP handshake process of FIG. 5 will now be described. For convenience, this handshake process may be referred to as a 'min-start' handshake process. In block 501 a delay period is set to a minimum value. The minimum value may be predefined. The minimum value may be defined such that the overhead incurred by sending UDP messages at intervals equal to the minimum duration is less than the overhead incurred by maintaining a TCP connection between the client device and the cloud device. It may be difficult to determine the overhead associated with maintaining a persistent TCP connection on a given network topology. However; it is expected that in the majority of scenarios the overhead associated with maintaining an open UDP communications path will be less than the overhead associated with maintaining a persistent TCP connection. Furthermore, when scaled up to a very large number of devices and connections, it will be significantly more resource efficient to use UDP for all devices for which an open time period is determined, even if for a few of those individual connections TCP would have incurred less overhead. Therefore, it will generally be advantageous for the minimum delay period to be very short. In some examples the delay period is set by the client device 20. In some examples the instruction set 22, when executed, cause the client device to set the delay period. In some examples block 501 is performed by the client device 20. In some examples block 501 may be performed by the cloud device.

In block 502, the client device sends a UDP test message to the cloud device. The UDP test message may have any of the features described above in relation to block 401 of FIG. 4. Block 502 may be performed in any of the ways described above in relation to block 401 of FIG. 4. In some examples (e.g. examples in which block 501 is performed by the client device) block 502 is performed responsive to the completion of block 501.

In block 503, the cloud device sends a reply to the client device at the expiry of the delay period. The reply may have any of the features described above in relation to block 402 of FIG. 4. Block 503 may be performed in any of the ways described above in relation to block 402 of FIG. 4.

In block 504 it is determined whether the reply has been received by the client device by a predetermined time. In some examples block 504 is performed by the client device, in which case determining whether the reply has been received by the predetermined time may comprise the client device waiting for a reply until the predetermined time. In some examples block 504 may be performed by the cloud device, in which case determining whether the reply has been received by the predetermined time may comprise the cloud device receiving an indication from the client device about whether or not it received the reply by the predetermined time. Block 504 may be performed in any of the ways described above in relation to block 404 of FIG. 4.

If it is determined in block 504 that a reply has been received by the predetermined time, the process moves to block 505. In block 505 the duration of the delay period is increased. Block 505 may be performed by the client device, or by the cloud device. Block 505 may be performed by the same device as block 501. The delay period may be increased by an increment which is small compared with the duration of the delay period. The size of the increment may be predetermined. Increasing the delay period by a relatively small increment will (potentially) increase the length of the UDP handshake process, but increasing the delay period by a relatively large increment will reduce the accuracy with which the UDP handshake process is able to determine the length of the open time period. The UDP handshake process relies on finding a delay period which results in a reply being successfully received, and a different delay period which results in a reply failing to be received. The actual duration of the open time period will then be between these two delays. Therefore, the less difference between the delays of successive iterations, the more accurately is the UDP handshake process able to determine the duration of the open time period (and therefore the optimal time interval for keep-alive messages). Once block 505 is complete, blocks 502-504 are repeated using the new delay period.

If it is determined in block 504 that a reply has not been received by the predetermined time, the process moves to block 506. In block 506 it is determined whether the current delay period (i.e. the delay period after which the cloud device sent the most recent reply) is equal to the minimum delay period. Block 506 may be performed by the client device or by the cloud device. Block 506 may be performed by the same device as block 501.

If it is determined in block 506 that the current delay period is not equal to the minimum delay period (i.e. it is longer), then in block 507 the open time period is determined to be equal to the longest delay period for which a reply was received by the client device 20. The longest delay period for which a reply was received by the client device will be the delay period used during the iteration preceding the current iteration. Block 507 may be performed by the client device or by the cloud device. Block 507 may be performed by the same device as block 501.

If it is determined in block 506 that the current delay period is equal to the minimum delay period, then in block 508 the open time period is determined to be too short to enable UDP communication between the client device and the cloud device. Block 507 may be performed by the client device or by the cloud device. Block 507 may be performed by the same device as block 501.

Thus, the process of FIG. 5 will output either a determined length of the open time period, or a determination that the open time period is too short for UDP communication to be used effectively (for example with a low computational overhead).

The example UDP handshake process of FIG. 6 will now be described. For convenience, this handshake process may be referred to as a 'max-start' handshake process. In block 601 a delay period is set to a maximum value. The maximum value may be predefined. The maximum value may be defined such that it is larger than a typical open time period of a NAT device or firewall. The maximum value may be defined such that it is of the same order as a typical open time period of a NAT device or firewall. Ideally, the maximum value is larger than the open time period being determined, by an amount which is small relative to the duration of the open time period. Block 601 may be performed by the client device 20, or by the cloud device 30, and/or in any of the ways described above in relation to block 501 of FIG. 5.

In block 602, the client device sends a UDP test message to the cloud device. The UDP test message may have any of the features described above in relation to block 502 of FIG. 5. Block 602 may be performed in any of the ways described above in relation to block 502 of FIG. 5.

In block 603, the cloud device sends a reply to the client device at the expiry of the delay period. The reply may have any of the features described above in relation to block 503 of FIG. 5. Block 603 may be performed in any of the ways described above in relation to block 503 of FIG. 5.

In block 604 it is determined whether the reply has been received by the client device by a predetermined time. Block 604 may be performed in any of the ways described above in relation to block 504 of FIG. 5.

If it is determined in block 604 that a reply has not been received by the predetermined time, the process moves to block 605. In block 605 the duration of the delay period is decreased. Block 605 may be performed by the client device, or by the cloud device. Block 605 may be performed by the same device as block 601. The delay period may be decreased by an increment (i.e. is decremented) which is small compared with the duration of the delay period. The size of the increment may be predetermined. Decreasing the delay period by a relatively small increment will (potentially) increase the length of the UDP handshake process, but decreasing the delay period by a relatively large increment will reduce the accuracy with which the UDP handshake process is able to determine the length of the open time period, for the reasons discussed above in relation to block 505 of FIG. 5. Once block 605 is complete, blocks 602-604 are repeated using the new delay period.

If it is determined in block 604 that a reply has been received by the predetermined time, the process moves to block 606. In block 606 the open time period is determined to be equal to the current delay period. Block 606 may be performed by the client device or by the cloud device. Block 606 may be performed by the same device as block 601.

Thus, the process of FIG. 6 will output a determined length of the open time period.

The example UDP handshake process of FIG. 7 will now be described. For convenience, this handshake process may be referred to as a 'binary search' handshake process In block 701 a maximum delay period and a minimum delay period are defined. The maximum delay period may have any of the features described above in relation to the maximum delay period set in block 601 of FIG. 6. The minimum delay period may have any of the features described above in relation to the minimum delay period set in block 501 of FIG. 5. Block 701 may be performed by the client device 20, or by the cloud device 30.

In block 702 a delay period is set to be the maximum delay period as defined in block 701. Block 702 may be performed by the client device 20, or by the cloud device 30. Block 702 may be performed in any of the ways described above in relation to block 601 of FIG. 6.

In block 703, the client device sends a UDP test message to the cloud device. The UDP test message may have any of the features described above in relation to block 502 of FIG. 5. Block 703 may be performed in any of the ways described above in relation to block 502 of FIG. 5.

In block 704, the cloud device sends a reply to the client device at the expiry of the delay period. The reply may have any of the features described above in relation to block 503 of FIG. 5. Block 704 may be performed in any of the ways described above in relation to block 503 of FIG. 5.

In block 705 it is determined whether the reply has been received by the client device by a predetermined time. Block 705 may be performed in any of the ways described above in relation to block 504 of FIG. 5.

If it is determined in block 705 that a reply has not been received by the predetermined time, the process moves to block 708. In block 708 a new maximum delay period is defined. The new maximum delay period is an average of the current maximum delay period and the current minimum delay period. The new maximum delay period replaces the current maximum delay period. Block 708 may be performed by the client device, or by the cloud device. Block 708 may be performed by the same device as block 701. Once block 708 is complete, blocks 702-705 are repeated using the new delay period.

If it is determined in block 705 that a reply has been received by the predetermined time, the process moves to block 706. In block 706 it is determined whether the difference between the maximum delay period and the minimum delay period is greater than a predefined threshold. The predefined threshold may be selected based on a desired accuracy of the UDP handshake process in determining the duration of the open time period. The predefined threshold may be selected based on a desired computational overhead of the UDP handshake process. The predefined threshold may be selected based on a desired run-time of the UDP handshake process. A relatively lower threshold will increase the length of the UDP handshake process, and also its accuracy, whereas a relatively higher threshold will reduce the accuracy and the length of the process. Block 706 may be performed by the client device, or by the cloud device. Block 706 may be performed by the same device as block 701.

If it is determined in block 705 that the difference between the maximum delay period and the minimum delay period is greater than the predefined threshold, the process moves to block 709. In block 709 a new minimum delay period is defined. The new minimum delay period is an average of the current maximum delay period and the current minimum delay period. The new minimum delay period replaces the current minimum delay period. Block 709 may be performed by the client device, or by the cloud device. Block 709 may be performed by the same device as block 701. Once block 709 is complete, the process moves to block 710.

In block 710 a delay period is set to be the minimum delay period as defined in block 709. Block 710 may be performed by the client device 20, or by the cloud device 30. Block 710 may be performed in any of the ways described above in relation to block 601 of FIG. 6. Once block 710 is completed, blocks 703-705 are repeated using the new delay period.

If it is determined in block 705 that the difference between the maximum delay period and the minimum delay period is less than or equal to than the predefined threshold, the process moves to block 707. In block 707 the open time period is determined to be equal to the current delay period. Block 707 may be performed by the client device or by the cloud device. Block 707 may be performed by the same device as block 701.

Thus, the process of FIG. 7 will output a determined length of the open time period. The process of FIG. 7 is a binary search process. It is more complex than the processes of FIGS. 5 and 6, but it can determine the open time period more accurately, and in a smaller number of iterations.

Each of the example UDP handshake processes described above may be implemented by a client device (e.g. the client device 20) in communication with a cloud device (e.g. the cloud device 30). Each of the example UDP handshake processes may be initiated in response to the client device not receiving the first UDP message before the expiry of the predetermined amount of time. Each of the example UDP handshake processes may be initiated by the client device 20. Although it is possible for several of the operations described below to be performed by the client device or by the cloud device, it is advantageous for all of the decision-making operations of the example UDP handshake processes to be performed by the client device, because this eliminates the need for the cloud device to monitor the progress of the process. Since the cloud device may be engaged in a large number of simultaneous UDP handshake processes with different (in some practical systems, millions of different) client devices, such monitoring would consume a large amount of computing resource.

The example process of FIG. 5 inherently rejects open time periods which are too short for UDP communication between the client device and the cloud device to be possible or worthwhile. However, this is not done by the example processes of FIGS. 4, 6 and 7. Therefore, in some examples in which the notification system 10 is to determine a duration of the open time period using a process which does not involve an inherent rejection mechanism (e.g. the example processes of FIGS. 4, 6 and 7) the client device is to determine whether a determined duration of the open time period meets a predefined criterion. In some such examples the instruction set 22 of the client device 23 is to, when executed by the processing unit 21, cause the client device to determine whether a determined duration of the open time period meets a predefined criterion. The predefined criterion may be, for example, a predefined minimum duration, such that an open time period having a duration greater than or equal to the minimum duration meets the predefined criterion. In some examples the predefined minimum duration is selected such that the overhead incurred by sending UDP messages at intervals equal to the minimum duration is less than the overhead incurred by maintaining a TCP connection between the client device and the cloud device.

To keep the UDP communications path between the cloud device and the client device open, such that the cloud device can send unsolicited notifications to the client device, the time which elapses between successive messages from client device is to be less than the duration of the open time period. Therefore, in some examples the client device 20 may be to send keep-alive UDP messages to the cloud device to keep the UDP communications path open. In some examples such keep-alive UDP messages may request the cloud device to send an acknowledgement UDP message to the client device. In some examples the client device 20 is to monitor elapsed time since it last sent a UDP message to the cloud device. In some examples the client device 20 is to send a keep-alive UDP message to the cloud device when the elapsed time reaches a predetermined threshold, which may be less than to the duration of the open time period. In some examples, the predetermined threshold may be less than the open time period by a margin of, for example 5-10% to account for traffic load on a communication link, or concurrent processing tasks being carried out by a device.

Each UDP keep-alive message may be as small as possible. In some examples, each UDP keep-alive message has a 1 byte payload. The header of a UDP message is naturally smaller than the header of a TCP message. These factors mean that UDP keep-alive messages can be sent at the same frequency as TCP keep-alive messages, for a significantly lower overhead. However; the settings of some firewalls or NAT devices may result in a very short open time period, such that to maintain an open UDP communications path between the cloud device 30 and the client device UDP keep-alive messages are to be sent at a very high frequency. In such situations, the overhead associated with maintaining an open UDP communications path may be equal to or greater than the overhead associated with maintaining a persistent TCP connection between the cloud device 30 and the client device. If the overhead associated with maintaining an open UDP communications path is greater than the overhead associated with maintaining a persistent TCP connection between the cloud device 30 and the client device, then it will generally be preferable to maintain the TCP connection between the cloud device and the client device instead of using UDP to send notifications from the cloud device 30 to the client device. Thus, in some examples the predefined criterion is defined such that an open time period having a duration which meets the predefined criterion corresponds to a UDP keep-alive message frequency which incurs an overhead that is less than the overhead associated with maintaining a persistent TCP connection.

It may be difficult to determine the overhead associated with maintaining a persistent TCP connection on a given network topology. However; it is expected that in the majority of scenarios the overhead associated with maintaining an open UDP communications path will be less than the overhead associated with maintaining a persistent TCP connection. Furthermore, when scaled up to a very large number of devices and connections, it will be significantly more resource efficient to use UDP for all devices for which an open time period has been determined, even if for a few of those individual connections TCP would incur less overhead.

If the client device 20 determines that the duration of the open time period meets the predefined criterion, in some examples the instruction set 22 of the client device 20 is to, when executed, cause the client device 20 to close the TCP connection. If the client device 20 determines that the duration of the open time period does not meet the predefined criterion (or if the output of the process of FIG. 4 is a determination that the open time period is too short) the client device will take no action to close the TCP connection. The TCP connection will then be maintained by the cloud device 30 and notifications will be sent from the cloud device using the TCP protocol.

The client device 20 may be to perform the above-described operations (the "UDP probing process") (i.e. initiating a TCP connection, waiting for a first UDP message from the cloud device, initiating a UDP handshake process if no first UDP message is received, closing the TCP connection if appropriate, etc.) each time the client device 20 detects a network change (e.g. a switch from a 3G to a Wi-Fi network). In some examples, the client device 20 is to store information about the behaviour of each network for which these operations are performed, e.g. on a memory of the client device 20. The instruction set 22 may be to, when executed, cause the client device 20 is to store information about the behaviour (e.g. whether or not the client device was able to receive unsolicited UDP messages, a determined open period of a NAT device or Firewall, etc.) each network for which a UDP probing process has been performed. The stored information may comprise a unique ID for the network (e.g. the MAC address of the default gateway). Advantageously, this enables the UDP probing process to be skipped when a client device 20 according to such examples re-connects to a known network (i.e. a network for which it has previously performed a UDP probing process, and for which it has stored information). In addition to the probing process, in some examples, the instruction set 22 may be to perform connection configuration tasks, and connection management tasks (such as replying to 'keep-alive' messages).

FIG. 3 shows the example cloud device 30. The cloud device 30 may be comprised in a notification system, e.g. the notification system 1. The cloud device 30 may be a server, a networking device, a desktop computer, or any other computing device suitable for use in providing a cloud-based IT service. In some examples the cloud device 30 comprises a push notification server. In the example of FIG. 3, the cloud device 30 comprises a processing unit 31, and an instruction set 32. The instruction set 32 may, for example, be stored on a machine-readable storage medium of the cloud device 30.

The processing unit 31 may comprise one or several central processing units (CPUs), microprocessors, and/or other hardware devices suitable for retrieval and execution of instructions, e.g. instructions of the instruction set 32. The processing unit 31 may fetch, decode, and execute instructions of the instruction set 32 to enable establishment and maintenance of a persistent connection between the cloud device 30 and one or several client devices (e.g. the client device 20) with a low computational overhead, as described below. In examples, the instruction set 32 may comprise instructions for exchanging messages with a client device as part of the UDP probing process mentioned above. In examples, the instruction set 32 may comprise instructions managing an established connection for example by sending 'keep-alive' messages. As an alternative or in addition to retrieving and executing instructions, processing unit 31 may include one or more electronic circuits comprising a number of electronic components for performing the functionality of part or all of the instruction set 32.

In some examples the cloud device 30 may further comprise one or several interfaces for communicating with other computing devices, e.g. the client device 20. In operation of the cloud device 30, as detailed below, interfaces may be used to send and receive data to and from other computing devices. An interface of the cloud device 30 may manage communications with client devices. Specifically, an interface may initiate connections with one or several client devices and then send or receive data to/from the client devices. Such an interface may have any of the features described above in relation to interfaces of the client device 20. The client device 20 may be to send and receive data to and from other computing devices using communications protocols including, but not limited to, TCP and UDP.

In some examples the cloud device 30 may further comprise a machine-readable storage medium. In some such examples the instruction set 32 may be stored on the machine-readable storage medium. Such a machine-readable storage medium may have any of the features described above in relation to a machine-readable storage medium of the client device 20.

The instruction set 32 is for execution by the processing unit 31 of the cloud device 30. In some examples the instruction set 32 is comprised in an application installed on or hosted by the cloud device 30. For example, the instruction set 32 may be comprised in a cloud-based IT service application hosted by the cloud device 30. In other examples the instruction set 32 may be comprised in a cloud-end notification application on the cloud device 30, which is to mediate connections between other applications or services on the cloud device 30 and one or several client devices.

The instruction set 32 is to, when executed by the processing unit 31, cause the cloud device to send a first UDP message to a client device (e.g. the client device 20), responsive to the initiation of a TCP connection by the client device (i.e. the client device which initiated the TCP connection). In some examples the first UDP message does not include a payload. However; the first UDP message may include a payload, for example a signature to enable the client device to identify the first UDP message as such (i.e. to ensure that the client device does not confuse a message from another source, or from a previous connection attempt, with the first UDP message. The cloud device may send the first UDP message immediately when the TCP connection is initiated.

In some examples, the cloud device may not actively determine whether or not the client device has received the first UDP message, i.e. it may be to perform no further operations in relation to attempting to open a UDP communications path, unless or until it receives a UDP message from the client device. It is advantageous for the cloud device not to perform any further operations after sending the first UDP message, because this eliminates the need for the cloud device to maintain a separate state relating to the progress of the UDP connection process. Since the cloud device is potentially simultaneously participating in millions of separate UDP connection processes, maintaining separate state for each individual process would require a lot of computing resources at the cloud end.

However; examples are possible in which the cloud device 30 is to actively determine whether the client device has received the first UDP message by the predetermined time. In some examples in which the cloud device 30 is to actively determine whether the client device has received the first UDP message, the instruction set 32 is further to, when executed by the processing unit 31, cause the cloud device 30 to determine whether the client device has received the first UDP message by a predetermined time after the creation of the TCP connection. The predetermined time may be a time during which the client device is to wait for a UDP message from the cloud device 30. The predetermined time may have any of the features described above in relation to the client device 20.

In some examples (e.g. examples in which the client device is to send an acknowledgement message responsive to receiving the first UDP message by the predetermined time) the instruction set 32 is to cause the cloud device 30 to determine whether the client device has received the first UDP message by waiting to receive an acknowledgement message from the client device. The acknowledgement message may have any of the features described above in relation to the client device 20. The acknowledgement message may be sent using the TCP connection. In some examples the cloud device is to wait for a predetermined amount of time to receive an acknowledgement message from the client device. In some such examples, if no acknowledgement message is received by the cloud device 30 before the expiry of the predetermined amount of time, the cloud device 30 is to determine that the client device has not received the first UDP message.

In some examples in which the client device is to close the TCP connection responsive to receiving the first UDP message by the predetermined time, the instruction set 32 is to cause the cloud device 30 to determine whether the client device has received the first UDP message by detecting a closure of the TCP connection by the client device. In such examples, if the cloud device detects a closure of the TCP connection by the client device, the cloud device may determine that the client device received the first UDP message by the predetermined time. In some examples the cloud device is to detect a closure of the TCP connection during a predetermined time period. In some such examples, if closure of the TCP connection is not detected before the end of the predetermined time period, the cloud device 30 is to determine that the client device has not received the first UDP message. It is envisaged that generally it will be advantageous for the client device to close the TCP connection, e.g. in response to receiving the first UDP message, as each client device need only be concerned with one connection: its own, whereas if the cloud device is responsible and the number of communication links is large (as may be the case in a practical example), then the computational overhead to a cloud device responsible for this task is considerable. However; examples are also possible in which the instruction set 32 is to, when executed, cause the cloud device to close the TCP connection responsive to receiving an acknowledgement message from the client device.

If the client device received the first UDP message by the predetermined time, this indicates that direct UDP communication between the cloud device and the client device is possible. This could be the case, for example, if the client device is directly exposed to the internet (i.e. it is not behind a firewall or NAT device). Notifications can therefore be sent to the client device from the cloud device at any time, without any particular operations being performed to open up a UDP communications path between the client device and the cloud device.

However; in most cases it is expected that there will exist a firewall or NAT device between the client device and the cloud device. In such cases, UDP messages sent by the cloud device to the client device which are not responses to previous outgoing UDP messages will be blocked by the firewall or NAT device. Thus, where a firewall or NAT device exists between the client device and the cloud device, the first UDP message will not be received by the client device by the predetermined time.

As mentioned above, in some examples the cloud device may, after sending the first UDP message, be to perform no further operations in relation to attempting to open a UDP communications path, unless or until it receives a UDP message from the client device. In such examples, the cloud device 30 may therefore send any further unsolicited messages to the client device (i.e. messages which are not replies to a message received from the client device) using the TCP connection.

In examples in which the cloud device is to actively determine whether the client device has received the first UDP message, if it is not determined by the cloud device 30 that the client device has received the first UDP message by the predetermined time, the instruction set 32 is to, when executed, cause the cloud device 30 to wait to receive a second UDP message from the client device. Not determining that the client device has received the first UDP message by the predetermined time may comprise either the cloud device making a determination that the client device has not received the first UDP message, or the cloud device failing to make a determination that the client device has received the first UDP message. For example, where the cloud device is to determine whether the client device has received the first UDP message by detecting closure of the TCP connection, a failure by the cloud device 30 to detect such a closure may be considered as the cloud device not determining that the client device has received the first UDP message by the predetermined time.

The sending of the second UDP message by the client device starts an open time period during which the client device is able to receive UDP messages from the cloud device, as described above in relation to the operation of the client device.

Receipt of the second UDP message by the cloud device 30 may cause the cloud device 30 to send a further UDP message to the client device, e.g. because the second UDP message requests a reply from the cloud device 30. In some examples the duration of the open time period during which the client device is able to receive UDP messages from the cloud device may be available to the cloud device (e.g. if the cloud device knows the settings of a firewall or NAT device between it and the client device). In some examples the second UDP message may indicate the duration of the open time period, e.g. if the client device knows the settings of a firewall or NAT device between it and the client device). In such examples the cloud device may send the further UDP message before the expiry of the open time period. In some examples the second UDP message may indicate a delay period, at the expiry of which the cloud device should send a reply to the client device. In such examples the cloud device may send the further UDP message at the expiry of the delay period. The further UDP message may comprise a notification message to notify the client device about an event relating to a cloud-based service. The further UDP message may be a keep-alive message. The further UDP message may be to cause the client device to send a reply message, responsive to the client device receiving the further UDP message.

In some examples in which the duration of the open time period is not known to the client device or to the cloud device, the further UDP message comprises a test message sent as part of a UDP handshake process for determining a duration of the open time period (e.g. the example processes of any of FIGS. 4-7).

In some examples the instruction set 32 is to, when executed by the processing unit 31, further cause the cloud device 30 to perform one or more operations of a UDP handshake process, e.g. any of the processes of FIGS. 4-7).

In some examples the instruction set 32 is to, when executed, cause the cloud device 30 to determine whether a duration of the open time period during which the client device is able to receive UDP messages from the cloud device (e.g. as output by a UDP handshake process) meets a predefined criterion. The predefined criterion may have any of the features described above in relation to the operation of the client device 20. Determining whether the duration of the open time period meets a predefined criterion may be performed in any of the ways described above in relation to the operation of the client device 20. If the cloud device determines that the duration of the open time period meets the predefined criterion, it may close the TCP connection. Otherwise, it may maintain the TCP connection and send notifications to the client device using the TCP protocol.

Figure 8:
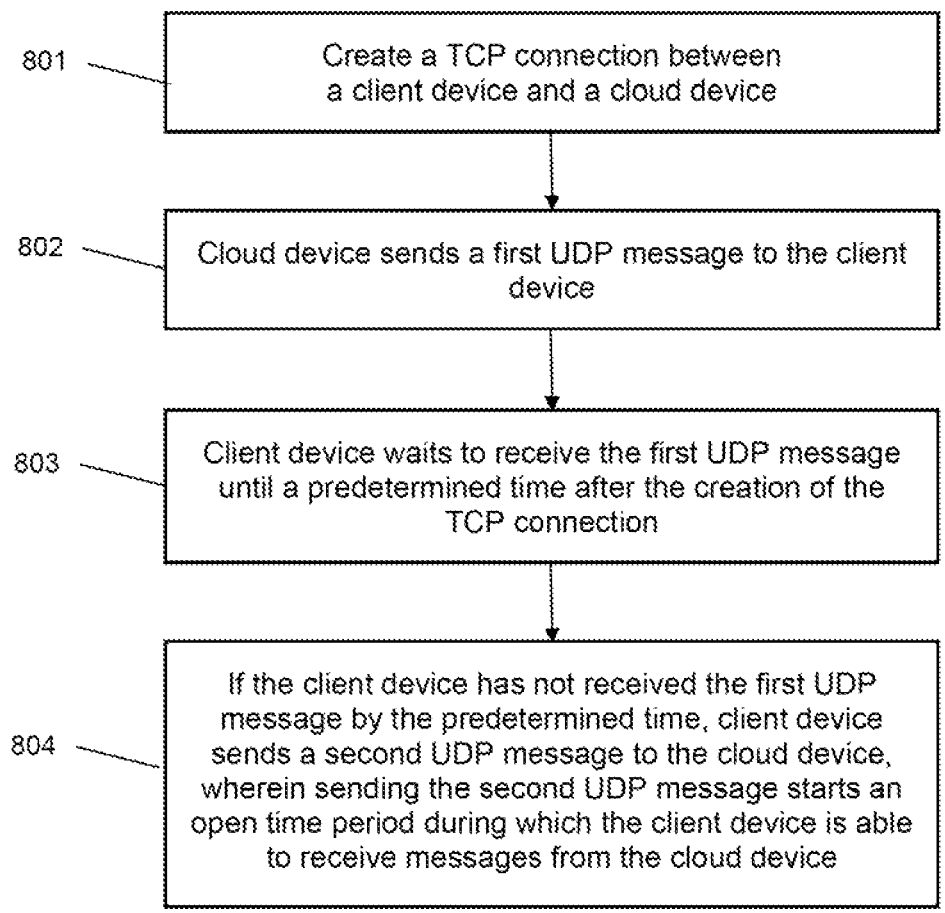
FIG. 8 is a flow chart of an example notification method.

FIG. 8 is a flowchart of an example method for execution by an example notification system, e.g. the example notification system 1 of FIG. 1. Although execution of the methods described below are with reference to the notification system of FIG. 1, other suitable devices and/or systems for execution of this method may be employed to practice the present techniques.

In block 801, a TCP connection is created between a client device (e.g. the client device 20) and a cloud device (e.g. the cloud device 30). The TCP connection may be initiated by the client device. The TCP connection may be created using any suitable technique of the art.

In block 802 the cloud device sends a first UDP message to the client device. The first UDP message may have any of the features described above in relation to the operation of the client device 20 or the cloud device 30. The first UDP message is sent using the UDP communications protocol. Sending the first UDP message may be performed in any of the ways described above in relation to the operation of the cloud device 30. Sending the first UDP message to the client device 20 may be performed in response to the creation of the TCP connection in block 701.

In block 803 the client device waits to receive the first UDP message until a predetermined time after the creation of the TCP connection. The predetermined time may have any of the features described above in relation to the operation of the client device 20. The duration of the predetermined time may be selected/determined in any of the ways described above in relation to the operation of the client device 20. Waiting to receive the first UDP message may comprise the client device monitoring elapsed time since the creation of the TCP connection. Waiting to receive the first UDP message may comprise the client device comparing a current elapsed time to the predetermined time.

In block 804, if the client device 20 has not received the first UDP message by the predetermined time, the client device sends a second UDP message to the cloud device. The second UDP message may have any of the features described above in relation to the operation of the client device 20 or the cloud device 30. The second UDP message is sent using the UDP communications protocol. Sending the second UDP message to the cloud device may be performed in response to a determination by the client device 20 that the first UDP message has not been received by the predetermined time. Sending the second UDP message may be performed in any of the ways described above in relation to the operation of the client device 20. Sending the second UDP message starts an open time period during which the client device is able to receive messages from the cloud device.

The cloud device 30 may then, (e.g. if required to respond to the second UDP message or to notify the client device of an event) send a further UDP message to the client device 20 during the open time period. The further UDP message may have any of the features described above in relation to the operation of the cloud device 30. The further UDP message is sent using the UDP communications protocol. Sending the further UDP message to the client device 20 may be performed in response to the receipt by the cloud device of the second UDP message. Sending the further UDP message to the client device may be performed a predetermined amount of time after the receipt of the second UDP message by the cloud device 30. Sending the further UDP message to the client device 20 may be performed a predetermined amount of time after the sending of the second UDP message by the client device 20. Sending the further UDP message to the client device 20 may be performed in response to a determination by the cloud device 30 that the open time period is about to end. Sending the further UDP message may be performed in any of the ways described above in relation to the operation of the cloud device 30.

Blocks 801-804 may be performed as and when a client device wishes to establish a communications link with a cloud device. A given cloud device may perform blocks 801-804 in conjunction with multiple different client devices simultaneously. A given cloud device may perform blocks 801-804 in conjunction with multiple different client applications on a single client device simultaneously. A given client device may perform blocks 801-804 in conjunction with multiple different cloud devices simultaneously. A given client device may perform blocks 801-804 in conjunction with multiple different cloud services on a single cloud device simultaneously.

Figure 9:
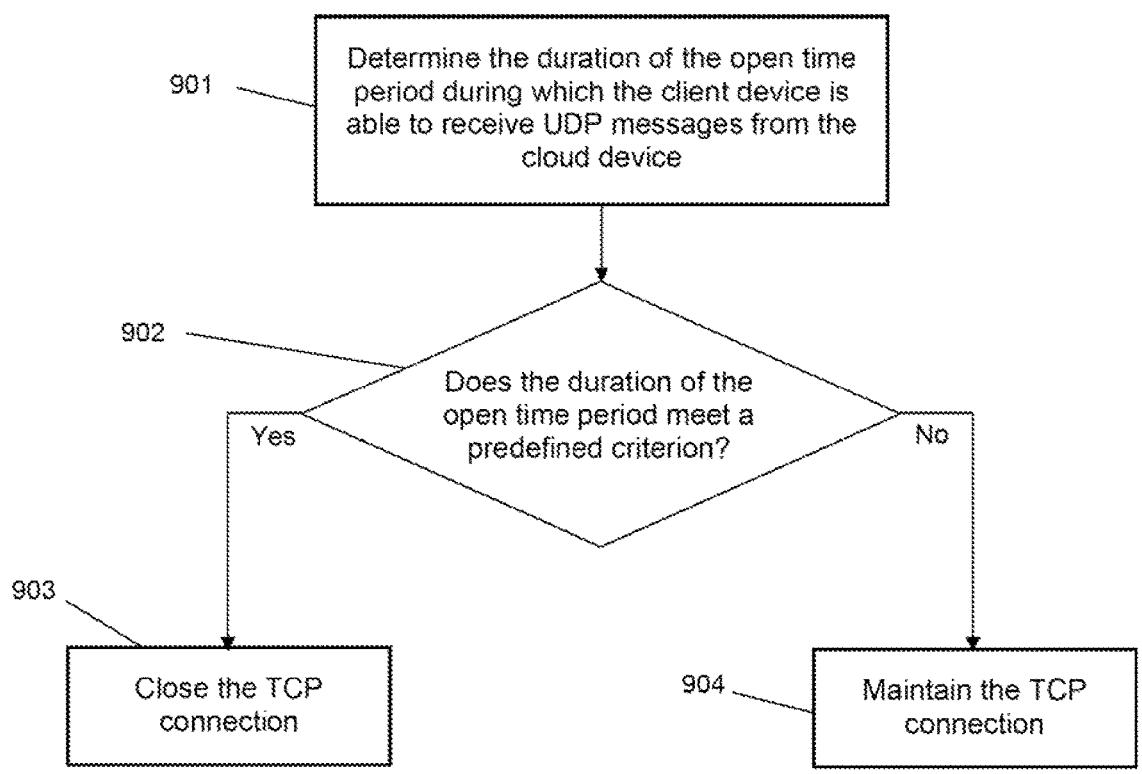
FIG. 9 is a flow chart of an example notification method.

FIG. 9 is a flowchart of an example method for execution by an example notification system, e.g. the example notification system 1 of FIG. 1. The method of FIG. 9 may be used by a cloud device (e.g. the cloud device 30) to decide whether to close or maintain a TCP connection with a client device (e.g. the client device 20). The method of FIG. 9 may be performed by the client device 20 in response to not receiving a first UDP message from the cloud device 20 by the predetermined time. The method of FIG. 9 may therefore be performed in situations where a firewall or NAT device prevents the client device 20 from receiving unsolicited UDP messages sent by the cloud device 30.

In block 901, the duration of the open time period during which the client device is able to receive UDP messages from the cloud device (i.e. the open time period started by the sending of the second UDP message) is determined. Determining the duration of the open time period may be performed by the client device. Determining the duration of the open time period may comprise performing a UDP handshake process, e.g. the UDP handshake process of any of FIGS. 4-7. Determining the duration of the open time period may be performed in any of the ways described above in relation to the operation of the cloud device 30 and/or FIGS. 4-7.

In block 902, it is determined whether the duration of the open time period (i.e. the duration determined in block 901) meets a predefined criterion. The predefined criterion may have any of the features described above in relation to the operation of the client device 20. The predefined criterion may be defined in any of the ways described above in relation to the operation of the client device 20. Determining whether the duration of the open time period meets a predefined criterion may be performed by the client device 20. Determining whether the duration of the open time period meets a predefined criterion may comprise retrieving a predefined criterion from a memory (e.g. a memory of or accessible by the client device 30) and comparing the duration of the open time period to the retrieved predefined criterion. Determining whether the duration of the open time period meets a predefined criterion may comprise determining whether an output of a UDP handshake process comprises a determination that the open time period is too short to enable UDP communication. Determining whether the duration of the open time period meets a predefined criterion may be performed in any of the ways described above in relation to the operation of the client device 20.

If, in block 902, it is determined that the duration of the open time period meets the predefined criterion, then in block 903 the TCP connection is closed. Closing the TCP connection may be performed by the client device 20. Closing the TCP connection may be performed using any suitable technique of the art. As described above, the predefined criteria may be defined such that if the open time period meets the predefined criterion, the overhead of keeping open a UDP communications path between the cloud device 30 and the client device 20 will be less than the overhead of maintaining a persistent TCP connection between the client device 20 and the cloud device 30. Thus, closing the TCP connection in this situation can reduce the computing resources used by the notification system.

If, in block 902, it is determined that the duration of the open time period does not meet the predefined criterion, then in block 904 the TCP connection is maintained. Maintaining the TCP connection may comprise the client device 20 taking no action to close the TCP connection. Maintaining the TCP connection may be performed using any suitable technique of the art. If the predefined criteria is defined such that if the open time period meets the predefined criterion, the overhead of keeping open a UDP communications path between the cloud device 30 and the client device 20 will be less than the overhead of maintaining a persistent TCP connection between the client device 20 and the cloud device 30, maintaining the TCP connection when the duration of the open time period does not meet the predefined criterion can ensure that the computing resource usage of the notification system is as small as possible.

The method of FIG. 9 (and/or any of the individual blocks 901-904) can in principle be performed by either the client device or the cloud device. However, it is advantageous for most or all of the blocks of the method of FIG. 9 to be performed by the client device, to reduce the computational burden on the cloud device, as is explained above.

Examples in the present disclosure can be provided as methods, systems or machine readable instructions. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules or engines of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operation steps to produce computer-implemented processing, thus the instructions executed on the computer or other programmable devices provide a step for realizing functions specified by flow(s) in the flow charts and/or block(s) in the block diagrams.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:
1. A method, comprising:
   creating a TCP connection between a client device and a cloud device;
   sending, by the cloud device, a first UDP message to the client device;

waiting, by the client device, to receive the first UDP message until a predetermined time after the creation of the TCP connection;

when the client device has not received the first UDP message by the predetermined time, sending, by the client device, a second UDP message to the cloud device, wherein sending the second UDP message starts an open time period during which the client device is able to receive UDP messages from the cloud device;

determining, by the client device, a duration of the open time period during which the client device is able to receive UDP messages from the cloud device;

determining, by the client device, whether the duration of the open time period meets a predefined criterion;

when the duration of the open time period meets the predefined criterion, closing the TCP connection; and when the duration of the open time period does not meet the predefined criterion, maintaining the TCP connection.

2. The method in accordance with claim 1, wherein determining the duration of the open time period comprises:
(a) sending, by the client device, a UDP test message to the cloud device, wherein the UDP test message requests a reply from the cloud device;
(b) responsive to receiving the UDP test message, the cloud device sending a reply to the client device, wherein the cloud device sends the reply after the expiry of a defined delay period;
(c) waiting, by the client device, until a predetermined time, to receive the reply from the cloud device;
(d) determining whether the client device has received the reply by the predetermined time;
(e) iterating (a)-(d) using a different defined delay period for each iteration, until a pair of consecutive iterations yield different determinations of whether the client device has received the reply by the predetermined time;
(f) determining the duration of the open time period based on at least one of the defined delay periods used for the pair of consecutive iterations.

3. The method in accordance with claim 2, wherein the delay period used for the first iteration is a maximum delay period and the delay period used for each subsequent iteration is incrementally shorter than the delay period used for the previous iteration.

4. The method in accordance with claim 2, wherein the delay period used for the first iteration is a minimum delay period and the delay period used for each subsequent iteration is incrementally longer than the delay period used for the previous iteration.

5. The method in accordance with claim 2, wherein the delay period used for each iteration is determined in accordance with a binary search process.

6. The method in accordance with claim 5, further comprising:
determining a difference between the defined delay periods used for the pair of consecutive iterations;
comparing the determined difference to a predefined threshold;
when the determined difference is smaller than the predefined threshold, performing (f); and
when the determined difference is greater than or equal to the predefined threshold, performing (e).

7. The method in accordance with claim 1, wherein the predefined criterion comprises a predefined minimum duration, such that an open time period having a duration greater than or equal to the minimum duration meets the predefined criterion.

8. The method in accordance with claim 7, wherein the predefined minimum duration is selected such that the overhead incurred by sending UDP messages at intervals equal to the minimum duration is less than the overhead incurred by maintaining a TCP connection between the client device and the cloud device.

9. A client device comprising:
a processing unit; and
an instruction set to, when executed by the processing unit:
initiate a TCP connection with a cloud device;
wait, for a predetermined amount of time, to receive a first UDP message from the cloud device;
when a first UDP message is not received from the cloud device before the expiry of the predetermined amount of time, send a second UDP message to the cloud device, wherein sending the second UDP message starts an open time period during which the client device is able to receive UDP messages from the cloud device;
determine a duration of the open time period during which the client device is able to receive UDP messages from the cloud device;
determine whether the duration of the open time period meets a predefined criterion;
when the duration of the open time period meets the predefined criterion, close the TCP connection; and
when the duration of the open time period does not meet the predefined criterion, maintain the TCP connection.

10. The client device in accordance with claim 9, wherein the instruction set is to, when executed by the processing unit, further cause the client device to close the TCP connection when a first UDP message is received from the cloud device before the expiry of the predetermined amount of time.

11. The client device in accordance with claim 9, wherein the instruction set is to, when executed by the processing unit, further cause the client device to send a keep-alive UDP message to the cloud device at regular intervals upon a determination that the duration of the open time period meets the predefined criterion, and wherein the duration of the intervals is less than or equal to the duration of the open time period.

12. A notification system comprising a client device and a cloud device;
wherein the client device is to:
connect to the cloud device using TCP;
wait for a first UDP message sent by the cloud device; and
when no UDP message is received from the cloud device within a predetermined time period, send a second UDP message to the cloud device, wherein sending the second UDP message starts an open time period during which the client device is able to receive UDP messages from the cloud device;
determine a duration of the open time period during which the client device is able to receive UDP messages from the cloud device;
determine whether the duration of the open time period meets a predefined criterion;
when the duration of the open time period meets the predefined criterion, close the TCP connection; and when the duration of the open time period does not meet the predefined criterion, maintain the TCP connection;

and wherein the cloud device is to send the first UDP message to the client device responsive to the creation of a TCP connection with the client device.

13. The notification system in accordance with claim 12, wherein the client device comprises a printer and the cloud device comprises a push notification server.

* * * * *